Dec. 24, 1935.  F. BLAU  2,025,565
INCANDESCENT LAMP
Filed April 26, 1929
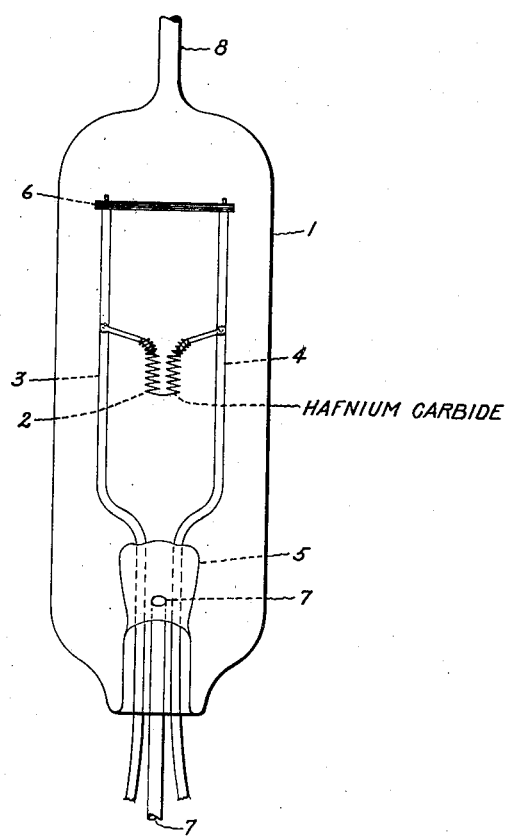
Inventor:
Fritz Blau,
by Charles V. Tullar
His Attorney.

Patented Dec. 24, 1935

2,025,565

UNITED STATES PATENT OFFICE 2,025,565

INCANDESCENT LAMP

Fritz Blau, Berlin-Charlottenburg, Germany, assignor to General Electric Company, a corporation of New York Application April 26, 1929, Serial No. 358,434
In Germany May 23, 1928

5 Claims. (Cl. 176—16)

The present invention comprises a novel incandescent lamp, the novel feature of which is a glower or incandescent body, consisting of hafnium carbide. Notwithstand the fact that the radiating faculty of hafnium carbide is less than that of tungsten this compound can be used advantageously as an illuminant in incandescent lamps because of its exceptional resistivity to the disintegrating effect of high temperatures. The melting point of hafnium carbide is nearly 500° absolute higher than the melting point of tungsten. In accordance with my invention hafnium carbide incandescent bodies are preferably operated in an inert gas, for example, nitrogen, argon, mercury vapor, or gaseous mixtures of various kinds.

The accompanying drawing shows somewhat conventionally an incandescent lamp containing a lighting body of hafnium carbide and being provided with means for introducing and withdrawing gas.

In carrying out the construction of an incandescent lamp containing a radiator of hafnium carbide it is preferable to construct the desired radiator first of hafnium metal. For example, when it is desired to form a ribbon or a spiral shaped incandescent body, a body of desired form is first constructed of hafnium wire and this wire is then transformed into hafnium carbide by heating the same in an atmosphere containing carbon in chemical combination. Such an atmosphere, for example, may consist of a mixture of nitrogen and hydrogen with an addition of a gas containing carbon in chemical combination, as, for example, acetylene. The light radiator may also assume other forms, for example, the form of a rod, tube, plate, sphere, or hemisphere, or other body of concentrated mass. The spherical or hemispherical shape is preferred in the case of a light radiator constituted either wholly or in part of one or more of the electrodes of an arc lamp, such for example as the arc lamp described in Friederich U. S. Patent 1,393,520 of October 11, 1921. As the hafnium metal can more easily be shaped than the brittle hafnium carbide, it is advisable in this case also to impart the desired final shape to a body of hafnium metal and then to convert such metal to the carbide. Before mounting a hafnium carbide body in a lamp it is desirable to remove parts of the radiator which are incompletely carbonized. Such incomplete carbonization may occur due to the cooling or screening effect on the carburizing process of supports for the hafnium lighting body.

In addition to the filling of inert gas which, as is well known, is used at substantial pressure in gas-filled lamps, (see for example Langmuir U. S. Patent 1,180,159) it is advantageous to add relatively small amounts of gaseous or volatile hydrocarbon compounds with a minimum of hydrogen content, say 0.5 per cent acetylene. In gas-filled lamps a filling of inert gas at a pressure of several hundred millimeters of mercury is commonly employed. In the case of incandescent lamps which are operated at extremely high temperatures, such as projection lamps, it is advisable to maintain a constant flow of hydrocarbon gas through the lamp. Hafnium carbide has a particular advantage as a radiator in projection lamps as it is operable at higher temperatures than incandescent bodies now employed and therefore has a higher intrinsic brilliancy.

The lamp shown in the drawing comprises a transparent envelope 1 in which is mounted a helical lighting body 2 of concentrated form mounted on the conductors 3, 4 which may consist of tungsten or other suitable material, and are sealed into a stem 5. These conductors serve in the usual way as means for conveying current to heat the lighting body 2 to incandescence. The supporting conductors are braced by an insulating strip 6. A supply of gas, for example, a mixture of inert gas, such as argon, and hydrocarbon gas, such as acetylene, is introduced through an inlet tube 7 communicating with the bulb interior through the stem 5 as indicated at 7. Gas leaves the bulb through an outlet tube 8.

I desire by the appended claims also to cover equivalent devices containing a body operating at incandescence, as, for example, electron discharge devices containing an incandescent cathode.

What I claim as new and desire to secure by Letters Patent of the United States is:—

1. An incandescent lamp comprising an envelope containing a body of hafnium carbide and electrical connections whereby an electric current may be passed through said body.

2. An incandescent lamp comprising an envelope, a light radiator constituted of hafnium carbide, means for heating said radiator to incandescence, a gas inert with respect to said carbide when operating at incandescence, and a second gas for supplying carbon to said light radiator.

3. An incandescent lamp comprising an envelope, a body of hafnium carbide therein, means for heating said body to incandescence, a filling of inert gas at substantial pressure, and a relatively smaller content of dissociable gas containing carbon in chemical combination.

4. An incandescent lamp comprising an envelope, a lighting body of hafnium carbide therein, means for heating said body to incandescence, and a filling therein of inert gas mixed with a fractional per cent of acetylene.

5. An incandescent lamp comprising an envelope, a body of hafnium carbide therein, means for heating said body to incandescence, and a filling therein of a gas inert with respect to said carbide.

FRITZ BLAU.